(12) United States Patent
Dos Santos

(10) Patent No.: US 6,286,672 B2
(45) Date of Patent: Sep. 11, 2001

(54) SLEEVE FOR STORING A DISC SHAPED OBJECT

(75) Inventor: David Dos Santos, Drongen (BE)

(73) Assignee: N.V. Metagra, Drongen (BE)

( * ) Notice: Subject to any disclaimer, the term of this patent is extended or adjusted under 35 U.S.C. 154(b) by 0 days.

(21) Appl. No.: 09/727,592

(22) Filed: Dec. 4, 2000

(30) Foreign Application Priority Data

Dec. 3, 1999 (EP) .................................................. 99204108

(51) Int. Cl.$^7$ .................................................. B65D 85/57
(52) U.S. Cl. .................. 206/312; 206/308.1; 312/9.58
(58) Field of Search .................................... 206/307, 308, 206/308.1, 311–313, 232, 425; 211/40; 229/69; 312/9.47, 9.48, 9.58

(56) References Cited

U.S. PATENT DOCUMENTS

| | | | |
|---|---|---|---|
| 2,499,220 | * | 2/1950 | Hinsdale ............................ 312/9.58 |
| 2,574,050 | * | 11/1951 | McCart ................................. 206/312 |
| 3,102,635 | * | 9/1963 | Werwin et al. ...................... 206/313 |
| 5,099,995 | * | 3/1992 | Karakane ............................. 206/312 |
| 5,232,275 | * | 8/1993 | Yamazoe ............................ 312/9.58 |
| 6,193,061 | * | 2/2001 | Lew et al. .......................... 206/308.1 |

* cited by examiner

Primary Examiner—Luan K. Bui
(74) Attorney, Agent, or Firm—Browdy and Neimark

(57) ABSTRACT

A sleeve for storing a disc shaped object, said sleeve comprising a first and second sleeve part, which are hingedly connected to each other by means of a hinge member, said sleeve parts comprise two flaps, folded towards each other along a fold line, said first and second sleeve part comprising a first and second circle segment shaped sliding groove, respectively located in such a manner that in a closed position of said sleeve, they extend along a quarter of a circle, said hinge member being located at a corner of said sleeve forming a middle point for said quarter of a circle, said sleeve further comprises a first and second connecting member, located in said first, respectively said second groove and connecting the sleeve parts to each other.

11 Claims, 5 Drawing Sheets

SLEEVE FOR STORING A DISC SHAPED OBJECT

The present invention relates to a sleeve for storing a disc shaped object, said sleeve comprising a first and second sleeve part which are hingedly connected to each other by means of a hinge member.

Such sleeves are well known for storing a CD audio, a CD-ROM, or a CD-1. Generally they are made of hard plastic boxes, having a carrying part and a cover part, which form both sleeve parts. The cover part hinges with respect to the carrying part in order to open or close the sleeve.

A drawback of the known sleeves is that they are inconvenient for mass storage and frequent use. For the storage of a plurality of discs, dedicated racks, having appropriate slots for each sleeve, are required. Moreover, retrieving the disc shaped object from the sleeve also requires a lot of movements.

An object of the invention is to provide a sleeve for storing a disc shaped object, which is easier to handle and more suitable for mass storage.

A sleeve according to the invention is therefore characterised in that the sleeve parts comprise two flaps, folded towards each other along a fold line, said first and second sleeve part comprising a first and second circle segment shaped sliding groove, respectively located in such a manner that in a closed position of said sleeve, they extend along a quarter of a circle, said hinge member being located at a corner of said sleeve forming a middle point for said quarter of a circle, said sleeve further comprises a first and second connecting member located in said first, respectively said second groove and connecting the sleeve parts to each other. The use of two sleeve parts which are connected to each other by means of the first and second connecting member and the hinge member, enables to open and close the sleeve by means of a pivotal movement of both sleeve parts with respect to each other. Since the first and second connecting member are located in their respective grooves, they move in their grooves upon opening and closing of the sleeve. That movement causes the connecting members to apply a force on the object upon opening the sleeve, in such a manner that the object is pushed out of the sleeve. Upon closing the sleeve, the fold line will on its turn push the object inside the sleeve. An easier handling is thus obtained when the object has to be removed from the sleeve or put into it. Since the hinge member is located at a corner, forming a middle point of the quarter of a circle, several sleeves can be connected together by means of their hinge member, thus providing suitable mass storage.

A first preferred embodiment of a sleeve according to the invention is characterised in that said sliding grooves each time extend through both of said flaps. This facilitates manufacturing as it enables to have the first and second sleeve part equally shaped.

Preferably, said hinge member and said first and second connecting member, are situated at the corner points of a rectangular triangle when said sleeve is in a closed position. The storage capacity of the sleeve is in such a manner not adversely affected by the presence of the connecting members.

A second preferred embodiment of a sleeve according to the invention is characterised in that each sleeve part comprises a set of attachment holes situated along a side of the sleeve at a calibrated distance of each other. The sleeve can thus be stored in an index file.

A third preferred embodiment of a sleeve according to the invention is characterised in that each sleeve part comprises a prehension member situated at a diagonally opposite corner of the one where said hinge member is located. The prehension member facilitates the opening of the sleeve.

The invention will now be described in more detail by means of a preferred embodiment shown in the drawings. In the drawings.

Figure 1:
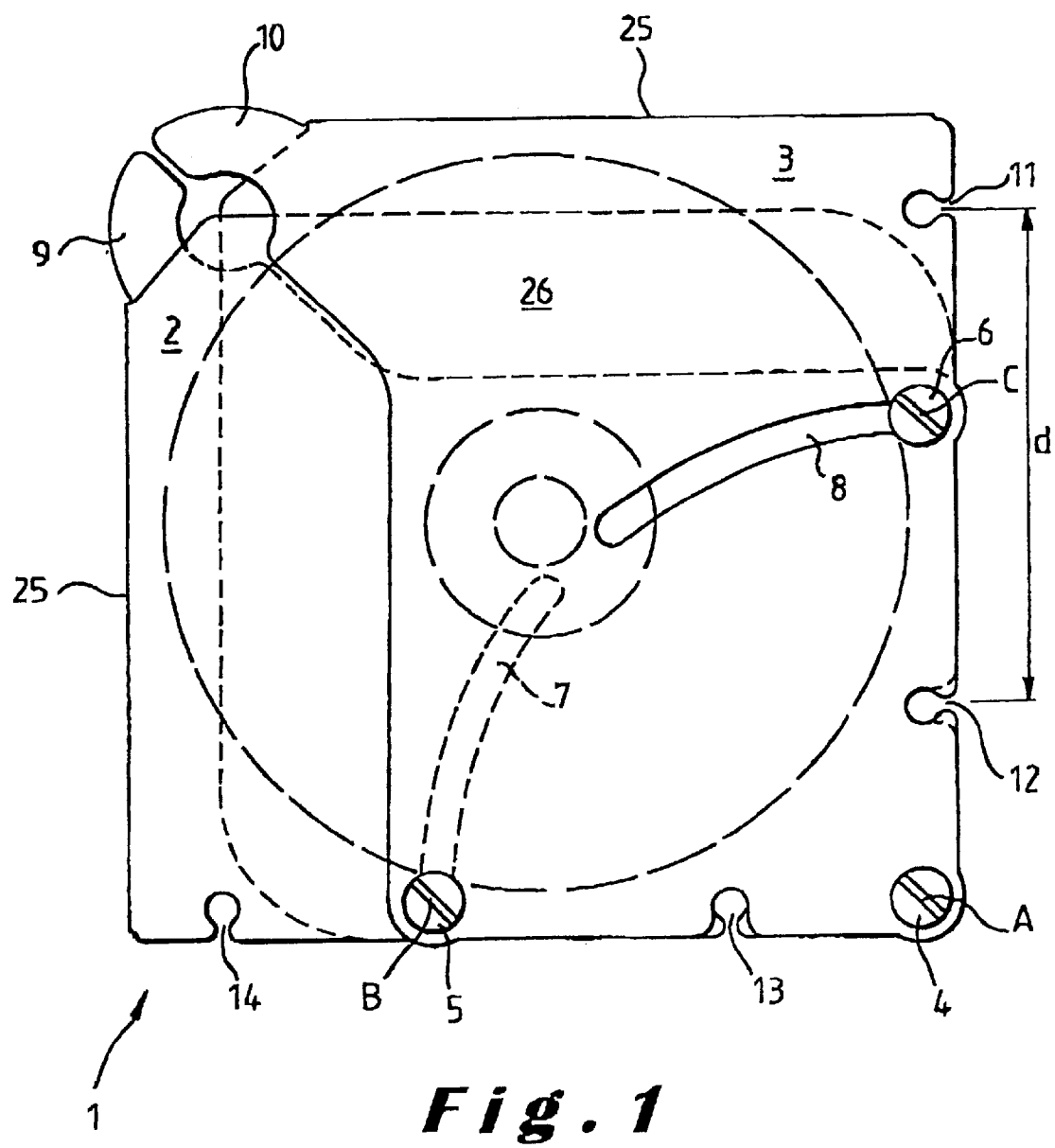
FIG. 1 shows a sleeve according to the invention in its closed state.

In the drawings, a same reference sign has been assigned to a same or analogous element.

The sleeve 1, illustrated in FIG. 1, comprises a first 2 and a second 3 sleeve part. The sleeve parts are preferably made of plastic or cardboard material. Among the used plastic material, silicone or polypropylene are preferred, because they are cheap and flexible. The first and the second sleeve part are shifted into each other and connected together by means of a hinge member 4 and a first 5 and second 6 connection member. The latter are mounted respectively in a first 7 and second 8 groove. The first and second groove have the shape of a circle segment and in a closed position of the sleeve, they extend together along a quarter of a circle, which middle-point A is located at the corner of the sleeve where the hinge member 4 is located.

The hinge member 4 and the first 5 and second 6 connecting member are situated at the corner points of a rectangular triangle ABC when the sleeve is in a closed position as illustrated in FIG. 1. In such a manner they do not form an obstacle for storing a disc shaped object such as a CD in the sleeve as they are situated outside the area occupied by the disc stored in the sleeve.

Preferably, the sleeve is provided with prehension members 9 and 10, situated at a diagonally opposite corner of the one where the hinge member 4 is located. Those prehension members form an entity with the material of which the sleeve part is made.

The sleeve is also preferably provided with attachment holes 11, 12, 13 and 14 located on the side where the connection members are provided. Those attachment holes are located each time on a calibrated distance d from each other. If that calibrated distance corresponds to the one of the clamps of an index file, the sleeve can be stored in an index file. This enables to store a disc in an index file and thus to store that disc together with a paper file without further provisions. The attachment holes are preferably omega shaped, what offers not only an easy manufacturing but also the possibility to insert and retrieve the sleeve from the clamps of an index file without opening the clamps.

Figure 2:
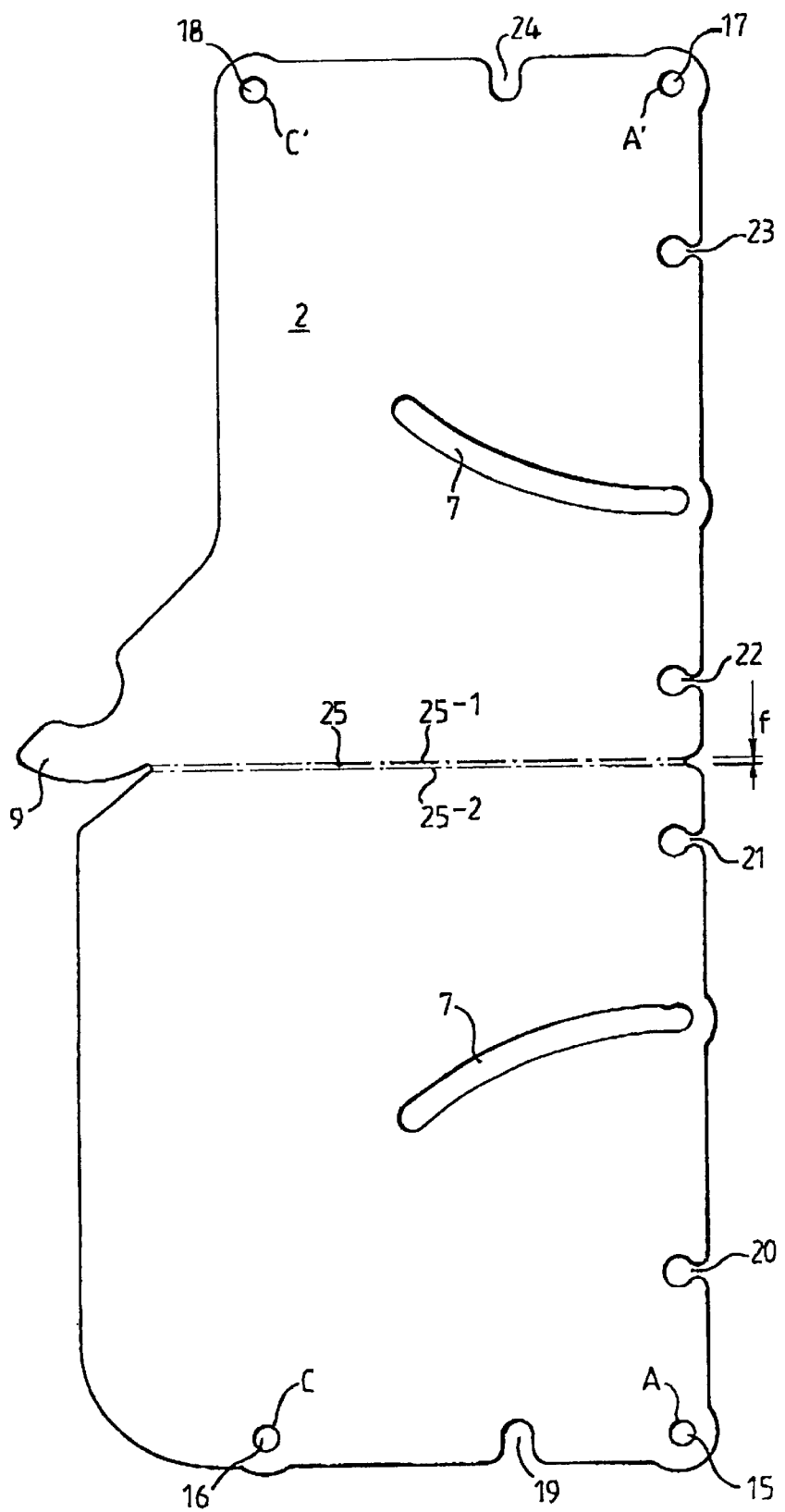
FIG. 2 shows a flap forming one of the sleeve parts in its unfolded configuration.

Each sleeve part comprises two flaps folded towards each other along a fold line. FIG. 2 shows one of those flaps in its unfolded state. Both flaps are made of a single sheet of material. The fold line 25 comprises two cutting lines 25-1 and 25-2, situated at a distance f of each other. That distance f is somewhat larger than the thickness of the object to be stored. The cutting lines locally weaken the material in such a manner that both flaps can easily be folded towards each other.

The FIG. 2 shows the presence of two first grooves 7. Both grooves are applied in such a manner that, when the flaps are folded towards each other, they coincide and extend through both flaps. The presence of those two grooves in a single sheet facilitates the manufacturing of the sleeve and enables the connecting members to cross both grooves as will become more clear hereinafter. However a single groove in each part could also be used. In the latter case, the connecting member is preferably made by a pen- and hole-system, incorporated in the material of the sleeve.

Perforations 15 and 17 are provided at the corners A and A' of the flaps for receiving the hinge member 4. Further perforations 16 and 18 are provided at the corners C and C' of the flaps for receiving the connection member 6. A rounded protrusion is present around the perforations 15, 16, 17 and 18 in order to provide sufficient material around the perforation and avoid a tear up of the latter. The omega shaped perforations 22, 21 and 20, 23 form the attachment holes 11 and 12. The prehension member 9 preferably shows a rounded shape for facilitating prehension and avoid injuring.

The cavities 19 and 24, which contrary to the perforations 20, 21, 22 and 23 are not omega shaped, form a recess at the location of attachment hole 13. An analogous recess is formed at the location of attachment hole 12 with the cavities of 24' (see FIG. 3) of the other sleeve part. The presence of those cavities enables to open the sleeve, even when the latter is attached in an index file, as will be explained hereinafter.

For forming the sleeve according to the present invention, the flaps, which constitute the first and second sleeve part, are folded according to their folding line 25. Perforation 15 respectively 16 now faces perforation 17 respectively 18. The grooves now also face each other. As the sleeve comprises a first and a second sleeve part, both parts have now to be combined and connected to each other. The folded flaps of the first and second sleeve part are therefore shifted over each other by having their respective flaps rotated over 180° with respect to each other. For that purpose, the folded flaps of the second sleeve are shifted over the first part in such a manner, that the perforations 16 and 18 of the second sleeve part face the first groove 7 and the perforations 16 and 18 of the first sleeve part face the second groove 8. The fold line 25 of the second sleeve part is located on an upper side, as shown in FIG. 1, whereas the fold line of the first sleeve part is located on a left lateral edge. The bottom part and the other lateral edge remain open, as they are formed by the open end of the folded flaps.

The hinge member 4 is then inserted through the perforations 15 and 17 of the sleeve parts, in order to hingedly connecting the sleeve parts. The connecting member 5, respectively 6, is inserted through the perforations 16 and 18 of the second sleeve part and the first groove 7, whereas the connecting member 6 is inserted through the perforations 16 and 18 of the second sleeve part and the second groove 8. In such a manner, the sleeve parts are connected together by means of the hinge member and the connecting members.

Figure 3:
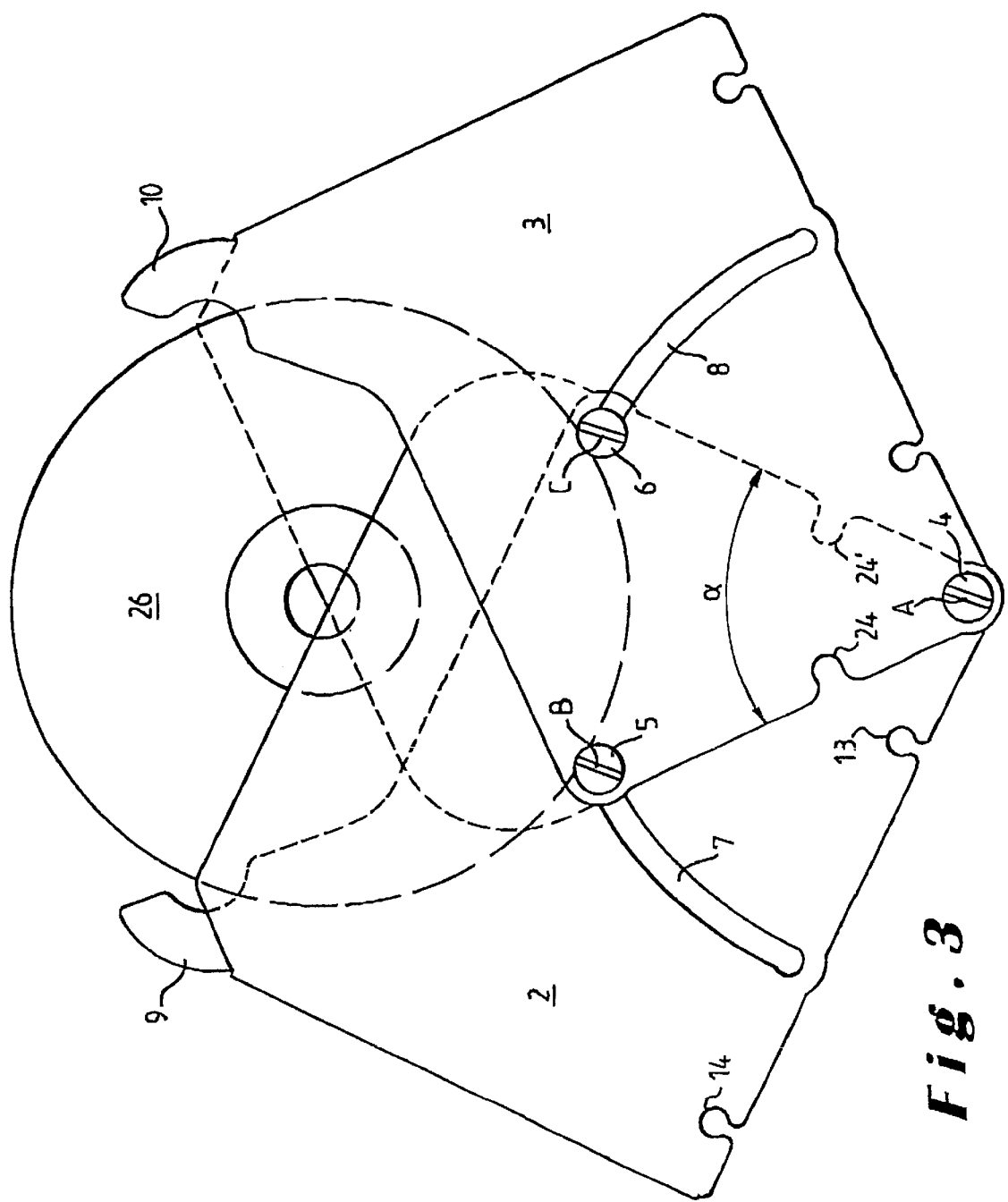
FIG. 3 shows a sleeve according to the invention in its open state.
Figure 4:
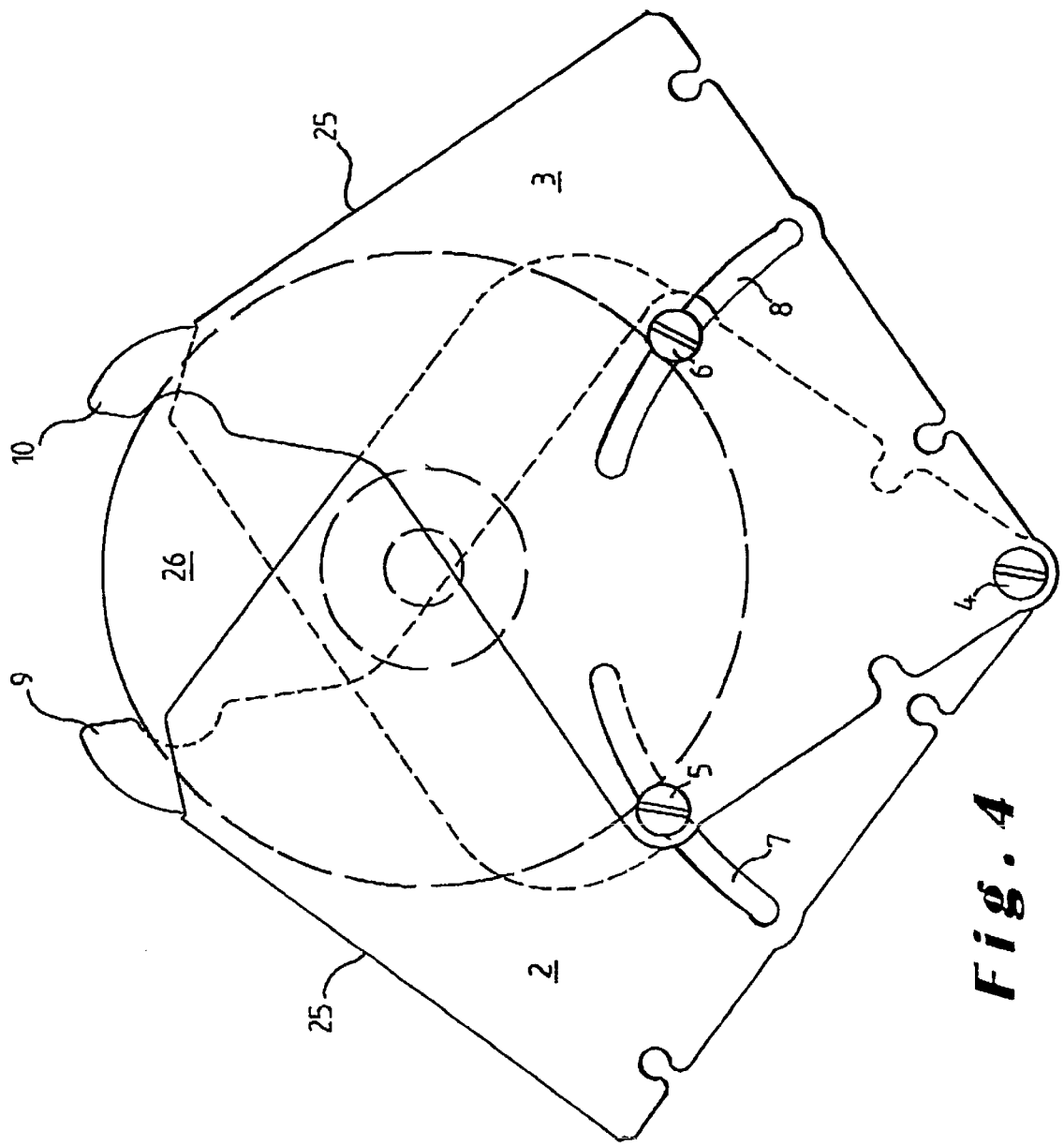
FIG. 4 shows a sleeve according to the invention in its half-open state.

The handling of the sleeve will now be described with reference to the FIGS. 3 and 4. When the sleeve is open, as shown in FIG. 3, the disc shaped object 26 is accessible as a substantial part of it is pushed out of the sleeve. The disc rests on the connecting members 5 and 6 which are now located in the upper part of their respective grooves 7 and 8. As a substantial part of the disc is accessible, the user can easily remove the disc. Also inserting the disc 26, after use, is convenient as a large gap is provided between the prehension members 9 and 10.

In case that the sleeve would be attached in an index file by means of the attachment holes 13, 14, the sleeve part 3 could still be opened, as cavity 24, due to its shape, does not clamp around the attachment ring of the index file.

Once the user has inserted the disc, he will push both sleeve parts 2 and 3 towards each other in order to close the sleeve. This causes both sleeve parts to hinge around their hinge member 4 and to shift into each other. During this movement, the fold lines 25 of each of the sleeve parts will exert a pressure on the disc, causing the latter to slide into the sleeve. The sliding movement of the first 5 and second 6 connecting member in the first and second groove, will guide both sleeves in their shifting into each other.

For opening the sleeve, the user will fetch the prehension members 9 and 10 and pull them away from each other. By this movement, both sleeve parts will hinge around their hinge member 4, and the connecting members 5 and 6 will start to slide into the grooves 7 and 8 respectively. By the latter sliding, they will exert a pressure on the disc 26, as they contact the disc as is shown in FIG. 4. When the connecting members 5 and 6 have reached the end of their respective grooves, the opening movement is stopped and the disc is accessible. Thus storing or retrieving the disc shaped object 26 can thus easily be realised by a simple pivoting movement of the sleeve parts 2 and 3.

Figure 5:
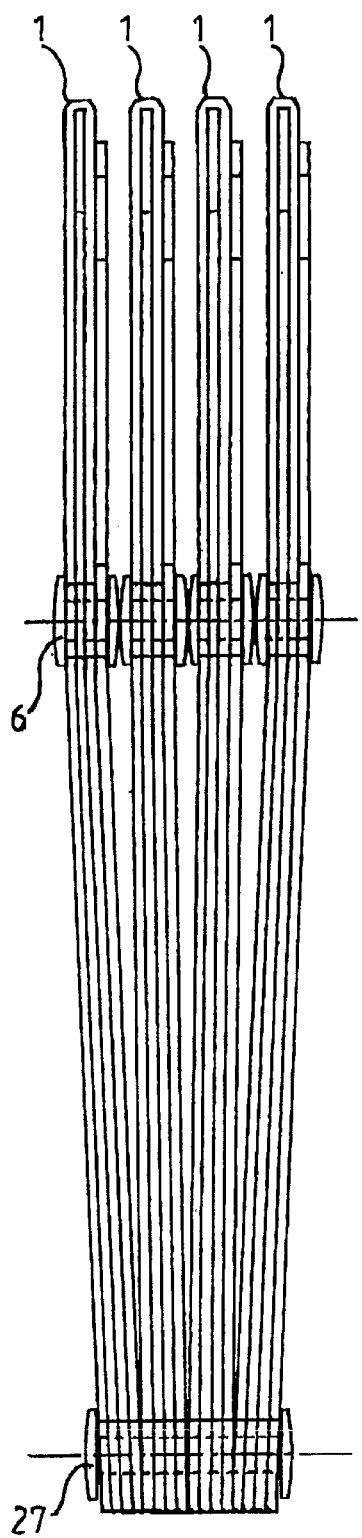
FIG. 5 shows a set of sleeves connected together.

As is shown in FIG. 5, the hinge member 27 can extend through a plurality of sleeves 1, thus combining those sleeves to a set. As the connecting members 5 only connect their respective sleeve parts, each sleeve can be opened or closed separately from each other whereas all sleeves of the set remain together. A mass storage of several discs can thus be obtained.

Figure 6:
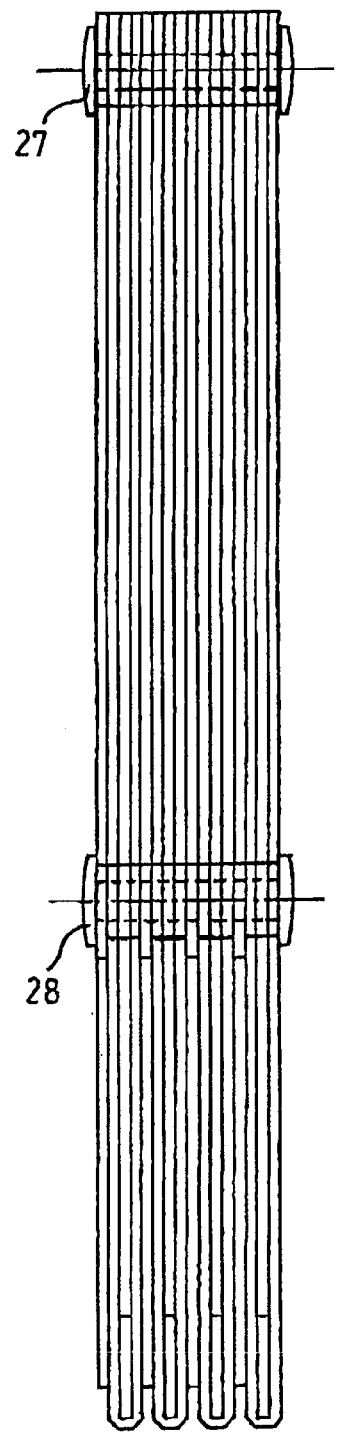
FIG. 6 shows the same set of sleeves but from another angle.

In order to avoid that, when combined to a set, each single sleeve would be capable to rotate over 180° with respect to the other sleeves of the set, a common connecting member 28 is provided in one of the grooves, as shown in FIG. 6. Comparable to hinge member 27, the common connecting member 28 extends through the groove of each of the sleeves forming the set. In such a manner, all the sleeves are held together by the hinge member 27 and the common connecting member 28, what means that they are connected at two positions separated from each other, thus avoiding an overall rotation of one of the sleeves.

The hinge member 4, 27, also takes care that the material of the sleeve parts remains under tension between the fold line and the hinge member in order to avoid damaging of the stored disc.

What is claimed is:

1. A sleeve for storing a disc shaped object, said sleeve comprising a first and second sleeve part, which are hingedly connected to each other by means of a hinge member, characterised in that the sleeve parts comprise two flaps, folded towards each other along a fold line, said first and second sleeve part comprising a first and second circle segment shaped sliding groove, respectively located in such a manner that in a closed position of said sleeve, they extend along a quarter of a circle, said hinge member being located at a corner of said sleeve forming a middle point for said quarter of a circle, said sleeve further comprises a first and second connecting member, located in said first, respectively said second groove and connecting the sleeve parts to each other.

2. A sleeve as claimed in claim 1, characterised in that said sliding grooves each time extend through both of said flaps.

3. A sleeve as claimed in claim 1, characterised in that said hinge member and said first and second connecting member are situated at the corner points of a rectangular triangle when said sleeve is in a closed position.

4. A sleeve as claimed in claim 1, characterised in that each of said flaps comprises a first and second perforation, located at a same side of said flap, said first perforation being situated at said corner and provided for receiving said hinge member, said second perforation of said first, respectively second sleeve part, being provided for receiving said first respectively said second connecting member.

5. A sleeve as claimed in claim 2, characterised in that said first and second sleeve part are shifted over each other with their respective flaps rotated over 180° with respect to each other.

6. A sleeve as claimed in claim 1, characterised in that each sleeve part comprises a set of attachment holes situated along a side of the sleeve at a calibrated distance of each other.

7. A sleeve as claimed in claim 6, characterised in that said calibrated distance corresponds to the one of the clamps of an index file.

8. A sleeve as claimed in claim 1, characterised in that each sleeve part comprises a prehension member situated at a diagonally opposite corner of the one where said hinge member is located.

9. A sleeve as claimed in claim 1, characterised in that said sleeve is made of a plastic flexible material in particular silicone.

10. A set of sleeves combining a number of sleeves according to claim 1, characterised in that said number of sleeves are connected by their hinge member.

11. A set of sleeves as claimed in claim 10, characterised in that said number of sleeves are further connected by a common connecting member applied in one of said grooves of all the sleeves belonging to the set.

* * * * *